United States Patent [19]
Petty

[11] 3,921,323
[45] Nov. 25, 1975

[54] HEADLIGHT NUMBER PLATE

[76] Inventor: Preston Lynn Petty, 403 N. Main St., Newberg, Oreg. 97132

[22] Filed: Apr. 29, 1974

[21] Appl. No.: 465,109

[52] U.S. Cl. ............................... 40/204; 40/129 C
[51] Int. Cl.² ......................................... G09F 13/02
[58] Field of Search.......... 40/200, 204, 209, 129 C, 40/131; 240/7.55, 58, DIG. 7

[56] References Cited
UNITED STATES PATENTS
1,816,289  7/1931  Kleinsmith ............................ 40/200

FOREIGN PATENTS OR APPLICATIONS
591,440  4/1959  Italy ...................................... 40/200
603,298  3/1960  Italy ...................................... 240/58
169,900  9/1934  Switzerland ........................... 40/125

*Primary Examiner*—Louis G. Mancene
*Assistant Examiner*—Wenceslao J. Contreras
*Attorney, Agent, or Firm*—Adrian J. LaRue

[57]  ABSTRACT

A headlight number plate has a lamp-mounting section in which a headlight is positioned. A plate section extends outwardly from the lamp-mounting section on which indicia is provided. Positioning members also extend outwardly from the lamp-mounting section and plate section for positioning the headlight number plate on a vehicle to ensure secure mounting of the headlight number plate thereon.

6 Claims, 4 Drawing Figures

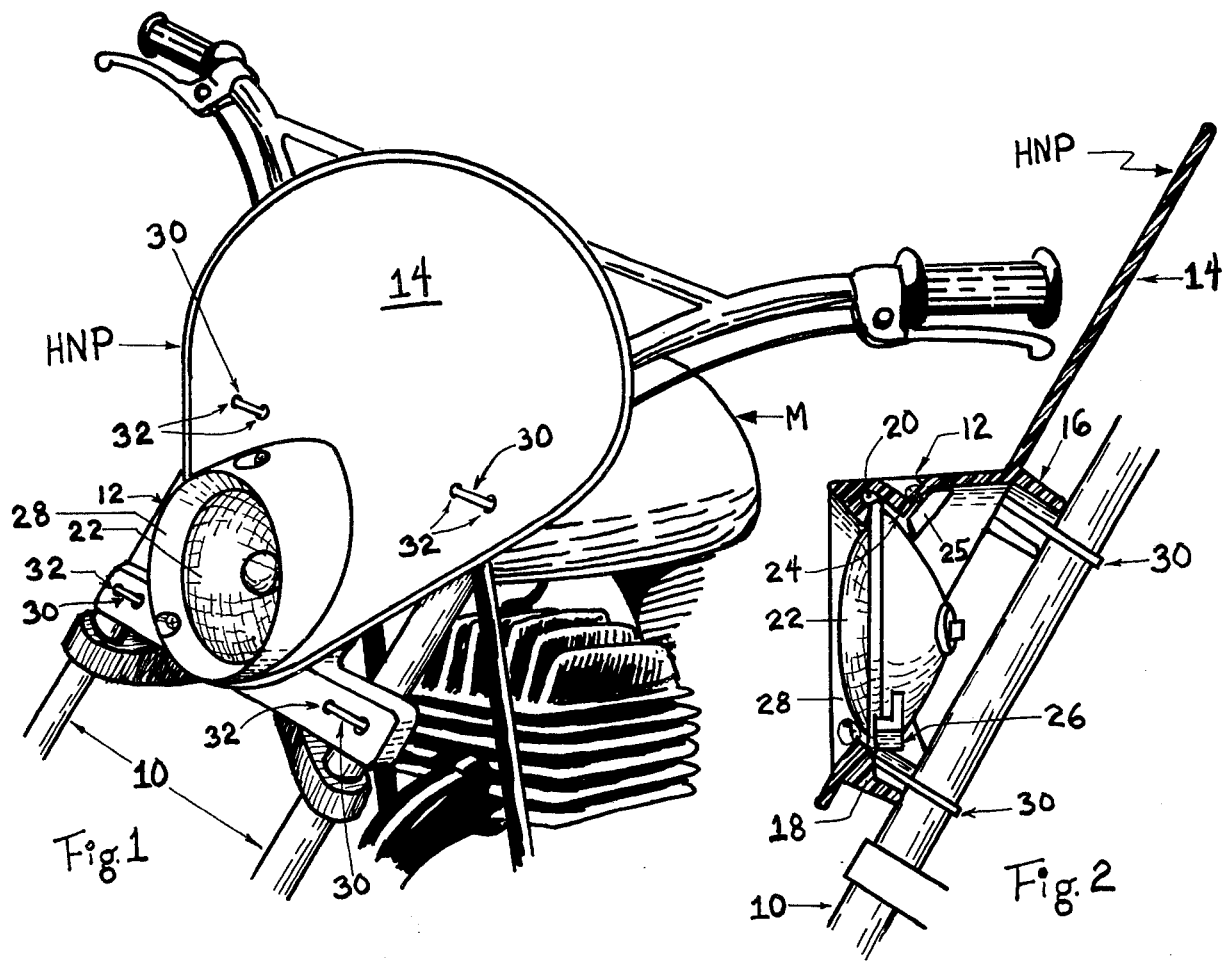
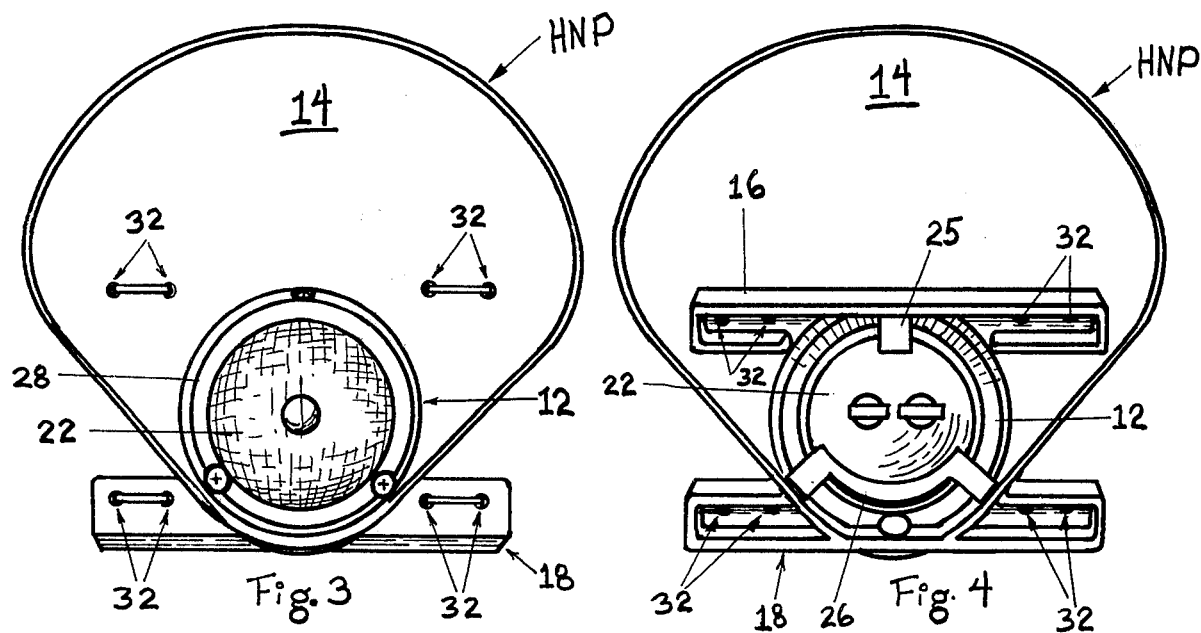

3,921,323

HEADLIGHT NUMBER PLATE

BACKGROUND OF THE INVENTION

In many sanctioned motorcycle races, a number plate is required on the motorcycles for purposes of identification and a light is required for safety reasons.

Headlights that are legally required for motorcycles are mounted in a position on motorcyles for highway use, but, in the case of off highway usage, these headlights are subjected to breakage as a result of their position on the motorcycles. Lights are necessary when the races extend into the night, and it is essential that lights be used that are not susceptible to breakage.

SUMMARY OF THE INVENTION

The present invention relates to a number plate and more particularly to a combination headlight number plate for use on motorcycles.

An object of the present invention is to provide a combination headlight number plate that is readily mounted on a motorcycle as a single integral unit to replace the existing headlight which can be remounted for replacement of the headlight number plate.

Another object of the present invention is the provision of a headlight number plate that includes a plate area on which indicia is provided.

A further object of the present invention is the provision of a headlight number plate which includes a section in which a headlight is mounted.

An additional object of the present invention is to provide a headlight number plate having positioning members for mechanical engagement with front forks of a motorcycle to properly position the headlight number plate thereon.

A still further object of the present invention is the provision of headlight number plate wherein the headlight is recessed in the headlight-mounting section to protect the headlight from brush, limbs and collision.

These and other objects of the invention will appear more fully from the following description and the accompanying drawing illustrating a preferred embodiment of the invention. It is to be understood that changes may be made from the exact details shown and described without departing from the principles of the invention.

BRIEF DESCRIPTION OF THE DRAWING

FIG. 1 is a perspective view of the headlight number plate in position on front forks of a motorcycle which is shown partly in perspective;

FIg. 2 is a cross-sectional view of the headlight number plate on the front forks with the headlight shown in position;

FIG. 3 is a front elevational view of the headlight number plate with the headlight therein; and FIg. 4 is a rear elevational view of the headlight number plate similar to FIg. 3.

DETAILED DESCRIPTION OF THE INVENTION

The present invention is a headlight number plate for use on vehicles and more particularly for use on motorcycles for providing identification of a motorcycle in motorcycle sanctioned races and for providing illumination during night-time off highway usage.

Turning now to the drawings, a headlight number plate HNP, as shown in FIGS. 1 and 2, is mounted on front forks 10 of a motorcycle M. Headlight number plate HNP is made in accordance with conventional molding techniques from a suitable plastic material which is lightweight and durable; and it includes a headlight-mounting section 12, a number plate section 14 and positioning sections 16 and 18.

Headlight-mounting section 12 is annular in configuration and has a part annular groove 20 in which part of the periphery of a sealed-beam headlight 22 is positioned. A projection 24 is provided at the upper inner surface of section 12 against which the headlight 22 abuts. An upper clamp 25 is held in position by a screw against projection 24 to retain the upper part of the headlight in position in groove 20. A U-shaped clamp 26 extends across the bottom section of headlight 22 and its free ends are secured to section 12 via screws or other suitable securing means so that clamps 25 and 26 removably secures headlight 22 in position in section 12.

Headlight 22 is positioned rearwardly within section 12 to protect the headlight from limbs and branches and a beveled surface 28 is provided at the outer surface of section 12 surrounding headlight 22 to provide greater lighting area.

Plate 14 extends outwardly from section 12 and has a planar configuration. Numbers or other indicia can be provided on the front surface of plate 14 for identification purposes. Plate 14 has a fan-like configuration.

Positioning members 16 and 18 extend outwardly from plate 14 and they extend along upper and lower parts of section 12. Positioning members 16 and 18 engage front forks 10 to position the headlight number plate in position thereon and mounting straps 30 extend through holes 32 in plate 14 and around fork tubes 10 to secure the headlight number plate HNP in position thereon.

The headlight number plate does provide some protection for the rider and the gas tank from rocks or other projecticles hurled by motorcycles in front.

It can readily be discerned that there has been illustrated and described a headlight number plate that is easily mounted in position on a motorcycle in order to provide ready identification and illumination during night-time racing or off highway usage. Although the invention has been described and illustrated with reference to a particular embodiment, it is to be appreciated and understood that various adaptations and modifications may be made without departing from the scope of the invention as set forth by the appended claims. The Plate 14 can be other than the configuration as illustrated, other securing means to secure the headlight within section 12 and to secure the headlight number plate on the fork tubes of the motorcycle can be provided. An opening can be provided in the lamp-mounting section so that light from the headlight can illuminate the indicia on the plate section.

The invention is claimed in accordance with the following:

1. A headlight number plate for mounting on fork members of motorcycles to provide illumination to identify the motorcycle comprising:

a plate member onto which indicia is to be provided;

a tubular headlight-mounting section provided by said plate member at one end thereof;

a headlight means in said tubular headlight-mounting section including securing means for removable securing said headlight means therein;

first positioning means extending outwardly from a rear surface of said plate member adjacent one side of said headlight-mounting section; and second positioning means extending outwardly from said plate member adjacent another side of said headlight-mounting section; said first and second positioning means adapted to engage the motorcycle forks and position said headlight number plate thereagainst; and mounting means provided by said first and second positioning means for mounting the headlight number plate in position on the motorcycle forks.

2. A headlight number plate according to claim 1 wherein said headlight-mounting section is annular and is positioned at the lower end of said plate member.

3. A headlight number plate according to claim 1 wherein said plate member has a fan-like configuration.

4. A headlight number plate according to claim 1 wherein said headlight means sets back within the headlight-mounting section to protect the headlight means.

5. A headlight number plate according to claim 1 wherein said first and second positioning means are positioned above and below respectively of said headlight-mounting section.

6. A headlight number plate according to claim 5 wherein said first positioning means is within the confines of the plate member and said second positioning means extends outside the confines of said plate member.

* * * * *